United States Patent [19]
Hackel et al.

[11] Patent Number: 5,475,527
[45] Date of Patent: Dec. 12, 1995

[54] FOURIER PLANE IMAGE AMPLIFIER

[75] Inventors: Lloyd A. Hackel, Livermore; Mark R. Hermann, San Ramon; C. Brent Dane, Livermore; Detlev H. Tiszauer, Tracy, all of Calif.

[73] Assignee: The Regents of the University of California, Oakland, Calif.

[21] Appl. No.: 313,514

[22] Filed: Sep. 26, 1994

[51] Int. Cl.⁶ .................................................... H01S 3/10
[52] U.S. Cl. ............................................ 359/334; 372/3
[58] Field of Search .......................... 359/334, 347, 359/349; 372/3

[56] References Cited

U.S. PATENT DOCUMENTS 5,260,954  11/1993  Dane et al. .................. 359/334 X
5,394,412  2/1995   Huignard et al. ............. 359/334 X Primary Examiner—Mark Hellner
Attorney, Agent, or Firm—Henry P. Sartorio; John P. Wooldridge

[57] ABSTRACT

A solid state laser is frequency tripled to 0.3 μm. A small portion of the laser is split off and generates a Stokes seed in a low power oscillator. The low power output passes through a mask with the appropriate hole pattern. Meanwhile, the bulk of the laser output is focused into a larger stimulated Brillouin scattering (SBS) amplifier. The low power beam is directed through the same cell in the opposite direction. The majority of the amplification takes place at the focus which is the fourier transform plane of the mask image. The small holes occupy large area at the focus and thus are preferentially amplified. The amplified output is now imaged onto the multichip module where the holes are drilled. Because of the fourier plane amplifier, only ~1/10th the power of a competitive system is needed. This concept allows less expensive masks to be used in the process and requires much less laser power.

20 Claims, 1 Drawing Sheet

FOURIER PLANE IMAGE AMPLIFIER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention generally relates to optical amplifiers, and more specifically, to a Fourier plane image amplifier.

2. Description of Related Art

The ablation of polymers at short wavelengths is a technique being used to construct the interconnect boards in the production of multichip modules (MCMs). Thousands of holes of approximately 10 μm to 25 μm diameter need to be drilled in the insulating layers of multi-layer boards in order to generate the interconnect pathways. In "Eximer Laser Ablation of Polyimide in a Manufacturing Facility," Applied Physics A54, 1992, Lankard and Woldbod of IBM have discussed a laser based system which illuminates an appropriately patterned mask with a high power beam and then relays this illuminated image onto the circuit board. This tool has been shown to be effective for the rapid ablation of a polyimide insulating layer in this application. Their process employs an eximer laser of relatively high peak power (~10 MW at 308 nm) for ablation and a relatively high average power (150 W) because the transmission through the holes of the mask is only about 1%. A laser of this power level is relatively expensive (~$300,000) and the high power loading requires expensive masks. Since this process only uses ~1% of the generated laser energy, there is significant room to develop a more efficient and lower cost design.

SUMMARY OF THE INVENTION

It is an object of the present invention to provide a fourier plane image amplifier.

It is a further object to provide a fourier plane image amplifier which comprises a mask in a low power beam wherein the mask is much less expensive than masks in existing systems.

A further object of the invention is to provide a fourier plane image amplifier having a mask in a low power beam, wherein the system requires about an order of magnitude less laser power than existing systems, and is based on a highly reliable, solid state laser technology.

In a specific embodyment of this device, a solid state laser is frequency tripled to 0.3 μm. A small portion of the laser is split off and generates a Stokes seed in a low power Stimulated Brillouin scattering (SBS) generator. The low power output passes through a mask with the appropriate hole pattern. Meanwhile the bulk of the laser output is focused into a larger SBS amplifier. The low power beam is directed through the same cell in the opposite direction. The majority of the amplification takes place at the focus which is the fourier transform plane of the mask image. Since the small holes occupy larger area at the focus, they are preferentially amplified. The amplified output is now imaged onto the MCM where the holes are drilled. Because amplification occurs in the fourier plane, only ~1/10th the power compared to a competitive system is needed. This concept allows less expensive masks to be used in the process and requires much less laser power.

DETAILED DESCRIPTION OF THE INVENTION

Figure 1:
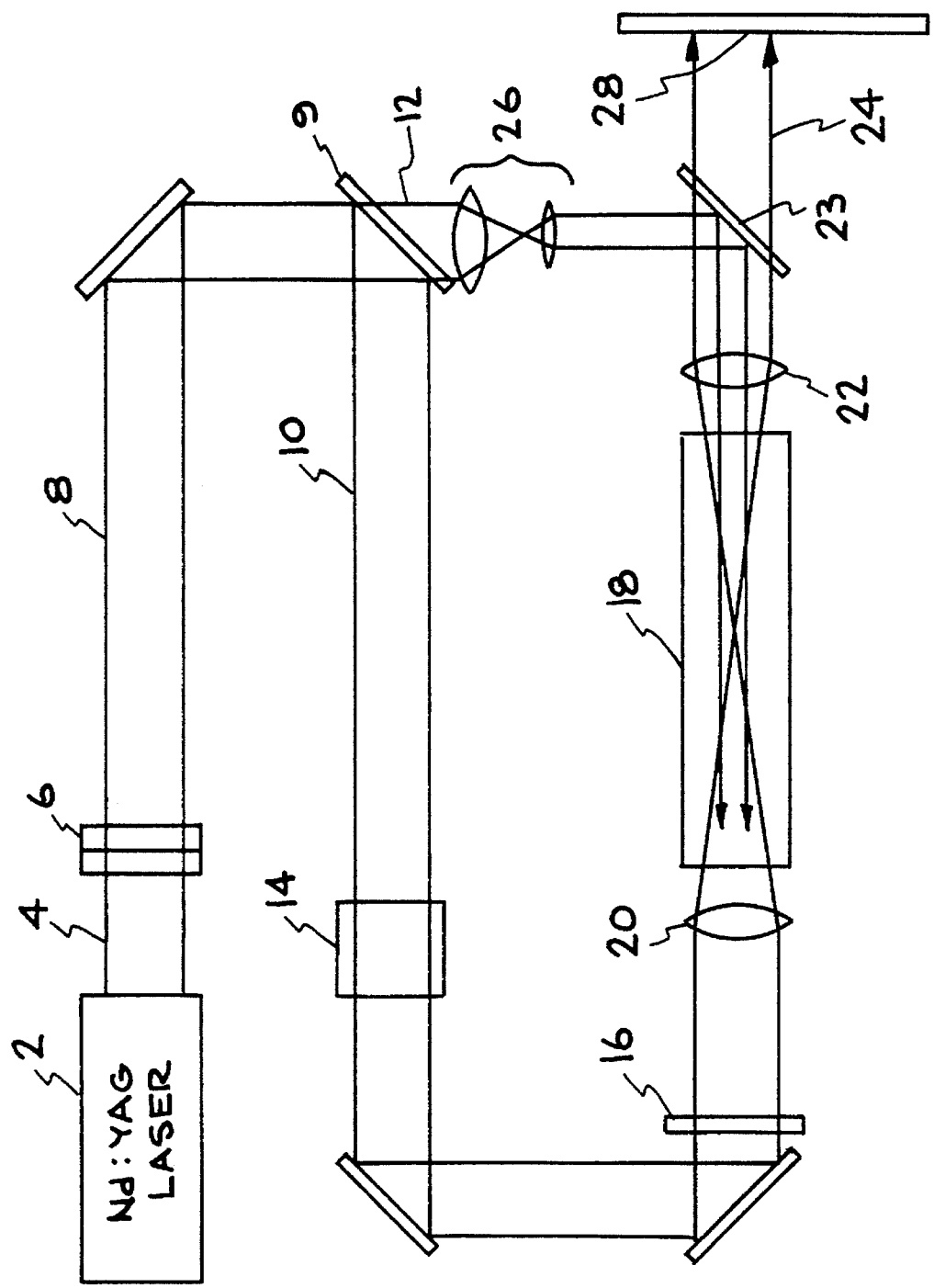
FIG. 1 shows a solid state laser pumped fourier amplifier.

The concept employs a low power, narrow-band, frequency tripled, diode-pumped solid state laser which is the source for pumping a Stimulated Brillouin scattering (SBS) oscillator and amplifier. A small portion of the pulsed output of a frequency tripled Nd:YAG is split off and frequency shifted to acquire an appropriate SBS Stokes frequency (appropriate for the particular SBS material used in the fourier amplifier). This shift can be accomplished in a focused oscillator cell or in a suitable frequency shifter such as an electro-optic crystal. The shifted light illuminates the mask and the transmitted portion is focused into the SBS amplifier cell. The much larger remainder of the tripled light is also focused into the SBS amplifier cell but from the opposite end. These focusing lenses are set up to form an image relay, that is, their foci overlap in the SBS cell and the pair of lenses image the mask to a point out in front of the amplifier cell. An additional telescope in the high power pump arm will adjust the size of the pump focus so as to maximize it's overlap with the Fourier plane of the information carrying seed beam. With this physical setup the amplification process works as follows: in the amplifier cell the leading temporal edge of the main beam (in this case tripled light) and similar leading edge of the light from the mask (the Stokes shifted image beam) interfere and through the electrostrictive effect build a density grating. Through the process of SBS energy from the main beam is scattered into the beam comprising the light from the mask, effectively amplifying this beam. The amplified beam can be subsequently imaged to a plane forming a high power image of the mask transmission. This technique can clearly be extended to many other processes and is operable with many wavelengths of laser light. In general the technique has the ability to print, image or ablate a given "mask" pattern onto a substrate with a minumum of required power.

Referring to FIG. 1, solid state laser 2 (for example, an Nd:YAG laser or an Nd:YLF laser) produces a pulsed output beam 4. Beam 4 then passes through non-linear crystal pair 6 which produces a pulsed frequency multiplied output beam 8 (for example, a tripled output beam 8). The non-linear crystal could alternately frequency shift the beam. At beamsplitter 9, a beam 8 is split into two beams: beam 10 and beam 12. Beam 10 passes through a Stokes shift generator 14 and therein is frequency shifted to acquire an appropriate stimulated Brillouin scattering (SBS) Stokes frequency. Generator 14 accomplishes this shift in a focussed oscillator cell or in a suitable frequency shifter such as an electro-optic crystal. The shifted light in beam 10 then illuminates a mask 16. The portion of beam 10 which is transmitted through mask 16 is focussed, by focussing lens 20, into an SBS amplifier cell 18. Beam 12 reflects off of dichroic mirror 23 and is focussed, by focussing lens 22, into cell 18, but from the opposite end. Focussing lenses 20 and 22 are set up to form an image relay, i.e., their foci overlap in SBS cell 18. Focussing lenses 20 and 22 also relay an image beam 24 which is the image of mask 16, through dichroic mirror 23, to a point 28 in front of the cell 18. Point 28 is an image point of image beam 24. Telescope 26 adjusts the size of beam 12 to maximize it's overlap with the Fourier plane of the information carrying seed beam, beam 10. With this physical setup, beams 10 and 12 interfere within SBS cell 18, and through the electrostrictive effect, build a density grating which converts energy from beam 12 to the image beam 24.

Because the conversion is proportional to the pump intensity, the majority of the gain occurs near the focus. Considering the mask image, the focus represents a Fourier transform plane where small features (such as holes) transform to large areas and large features (such as the large blocked areas) transform to small areas which have no energy content. Since conversion from the higher power pump to the lower power Stokes image occurs primarily where the pump and Stokes components overlap, the process is extremely efficient. This results because the Stokes image in the focused or Fourier plane now occupies the majority of the overlap area. Since most of the laser energy is now localized where the holes of the mask are located, only a few watts of laser power are now required to do the same job as currently employed 150 watt sources.

This invention allows the mask to be illuminated at low power, permitting inexpensive chrome masks or masks comprising opaque material to be used instead of very expensive multilayer dielectric masks. Much lower average power output is required from the illuminator which results in a less expensive system. Finally, the invention allows the use of an all solid state diode pumped laser or a flashlamp pumped laser. This laser will have longer maintenance free lifetime and will not require hazardous gases such as chlorine or fluorine.

The invention is operated by first producing a beam of laser light and then splitting this first beam into a second beam and a third beam. A Stokes seed is generated in the second beam and a pattern is formed with a mask. This mask beam is then focussed into an entrance aperture of a stimulated Brillouin scattering (SBS) cell. The third beam is focussed into an entrance/exit aperture of the SBS cell and the overlap of this beam is maximized with the mask beam within said SBS cell. An image beam is produced from the SBS cell and exits from the entrance/exit aperture.

Changes and modifications in the specifically described embodiments can be carried out without departing from the scope of the invention, which is intended to be limited by the scope of the appended claims.

We claim:

1. A fourier plane image amplifier, comprising
    a laser for producing a first beam of light;
    a beamsplitter for splitting said first beam into a second beam and a third beam;
    means for generating a Stokes seed in said second beam to form a Stokes seed beam;
    a mask for forming a pattern in said Stokes seed beam to form a mask beam;
    a stimulated Brillouin scattering (SBS) cell having an entrance aperture and an entrance/exit aperture;
    a first focussing lens for focussing said mask beam into said SBS cell through said entrance aperture; and
    a second focussing lens for focussing said third beam into said SBS cell through said entrance/exit aperture, wherein an image beam is produced by said SBS cell, said image beam exiting from said entrance/exit aperture.

2. The fourier plane image amplifier of claim 1, further comprising a telescope located in said third beam for maximizing the overlap of said third beam with said mask beam within said SBS cell.

3. The fourier plane image amplifier of claim 1, wherein said laser comprises a solid state laser.

4. The fourier plane image amplifier of claim 3, wherein said solid state laser is selected from a group consisting of an Nd:YAG laser and an Nd:YLF laser.

5. The fourier plane image amplifier of claim 1, further comprising at least one non-linear crystal for frequency shifting said first beam of light.

6. The fourier plane image amplifier of claim 1, further comprising at least one non-linear crystal for frequency multiplying said first beam of light.

7. The fourier plane image amplifier of claim 1, wherein said generating means comprises a Stokes shift generator.

8. The fourier plane image amplifier of claim 7, wherein said Stokes shift generator comprises an oscillator cell.

9. The fourier plane image amplifier of claim 7, wherein said Stokes shift generator comprises a frequency shifter.

10. The fourier plane image amplifier of claim 9, wherein said frequency shifter comprises an electro-optic crystal.

11. The fourier plane image amplifier of claim 1, wherein said mask comprises chrome.

12. The fourier plane image amplifier of claim 1, wherein said mask comprises opaque material.

13. The fourier plane image amplifier of claim 1, wherein said solid state laser comprises a solid state laser diode optical pumping system.

14. The fourier plane image amplifier of claim 1, wherein said solid state laser comprises a flashlamp pumping system.

15. The fourier plane image amplifier of claim 1, wherein said telescope comprises two positive lenses.

16. A method of using a fourier plane image amplifier, comprising:
    producing a first beam of light;
    splitting said first beam of light into a second beam and a third beam;
    generating a Stokes seed in said second beam to form a Stokes seed beam;
    forming a pattern with a mask in said Stokes seed beam to form a mask beam;
    focussing said mask beam into a stimulated Brillouin scattering (SBS) cell;
    focussing said third beam into said SBS cell in a counter direction of said mask beam;
    maximizing, with a telescope, the overlap of said third beam with said mask beam within said SBS cell; and
    producing an image beam from said SBS cell.

17. The method of claim 16, wherein the step of producing a first beam of light includes producing said first beam of light with a solid state laser.

18. The method of claim 16, further comprising the step of frequency shifting said first beam of light.

19. The method of claim 16, further comprising the step of frequency multiplying said first beam of light.

20. The method of claim 16, wherein the step of producing a first beam of light by a laser includes optically pumping said laser with a pumping system selected from a group consisting of a laser diode pumping system and a flashlamp pumping system.

* * * * *